United States Patent
Shimizu et al.

(10) Patent No.: US 10,190,527 B2
(45) Date of Patent: Jan. 29, 2019

(54) CONTROL SYSTEM OF COMPRESSION IGNITION TYPE INTERNAL COMBUSTION ENGINE

(71) Applicant: TOYOTA JIDOSHA KABUSHIKI KAISHA, Toyota-shi, Aichi-ken (JP)

(72) Inventors: Hajime Shimizu, Gotenba (JP); Noriyuki Takada, Susono (JP); Yusuke Takasu, Nagaizumi-cho (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/591,175

(22) Filed: May 10, 2017

(65) Prior Publication Data

US 2017/0335790 A1   Nov. 23, 2017

(30) Foreign Application Priority Data

May 17, 2016   (JP) ................................. 2016-098742

(51) Int. Cl.
 *F02D 41/40*    (2006.01)
 *F02B 15/02*    (2006.01)
 (Continued)

(52) U.S. Cl.
 CPC .............. *F02D 41/402* (2013.01); *F02B 9/04* (2013.01); *F02B 15/02* (2013.01); *F02D 35/028* (2013.01);
 (Continued)

(58) Field of Classification Search
 CPC .... F02D 41/00; F02D 41/0047; F02D 41/028; F02D 41/30; F02D 41/3035;
 (Continued)

(56) References Cited

U.S. PATENT DOCUMENTS 7,121,254 B2 * 10/2006 Wickman .............. F02D 19/081
123/304
8,151,741 B2 * 4/2012 Shimasaki ................ F02B 1/12
123/3

(Continued)

FOREIGN PATENT DOCUMENTS

EP   0 886 050 A2   12/1998
EP   1 607 609 A1   12/2005
(Continued)

*Primary Examiner* — John Kwon
*Assistant Examiner* — Johnny H Hoang
(74) *Attorney, Agent, or Firm* — Finnegan, Henderson, Farabow, Garrett & Dunner, LLP

(57) ABSTRACT

An action of injection of the main injection fuel (QM) from the fuel injector (3) is started within a range of crank angle from 10 degree before the compression top dead center to 10 degree after the compression top dead center. A smaller amount of the auxiliary injection fuel (QN) than the main injection fuel (QM) is made to be injected from the fuel injector (3) before the main injection fuel (QM) so as to make the auxiliary injection fuel (QN) ignite by the premixed charge compression ignition. The injection timing of the auxiliary injection fuel (QN) is controlled to a timing whereby a heat generated by the premixed charge compression ignition of the auxiliary injection fuel (QN) causes the premixed charge compression ignition of the main injection fuel (QM) after the start of injection of the main injection fuel (QM).

14 Claims, 14 Drawing Sheets

(51) Int. Cl.
*F02D 41/00* (2006.01)
*F02B 9/04* (2006.01)
*F02D 41/30* (2006.01)
*F02D 35/02* (2006.01)
*F02D 41/38* (2006.01)

(52) U.S. Cl.
CPC ..... *F02D 41/0047* (2013.01); *F02D 41/3035* (2013.01); *F02D 41/3047* (2013.01); *F02D 41/401* (2013.01); *F02D 41/403* (2013.01); *F02D 2041/389* (2013.01); *Y02T 10/128* (2013.01); *Y02T 10/44* (2013.01)

(58) Field of Classification Search
CPC .... F02D 41/3047; F02D 41/40; F02D 41/401; F02D 41/402; F02D 41/403; F02D 1/00; F02D 2250/00; F02D 2041/0047; F02B 9/04; F02B 15/02; F02B 2275/14; Y02T 10/123; Y02T 10/128
USPC .................. 123/295–299, 305; 701/102–105
See application file for complete search history.

(56) References Cited

U.S. PATENT DOCUMENTS

| | | |
|---|---|---|
| 2003/0230276 A1 | 12/2003 | Kataoka et al. |
| 2010/0268442 A1* | 10/2010 | Kabashima ......... F02D 41/0025 701/103 |
| 2011/0056459 A1 | 3/2011 | Nada |
| 2012/0046854 A1 | 2/2012 | Sangkyu et al. |
| 2013/0340720 A1* | 12/2013 | Kuzuyama ............ F02D 41/402 123/478 |
| 2014/0076291 A1* | 3/2014 | Wong .................. F02D 19/0647 123/568.11 |

FOREIGN PATENT DOCUMENTS

| | | |
|---|---|---|
| FR | 2835881 A1 | 8/2003 |
| JP | 2004-3439 | 1/2004 |
| JP | 2010-71250 | 4/2010 |
| JP | 4546872 | 9/2010 |

* cited by examiner

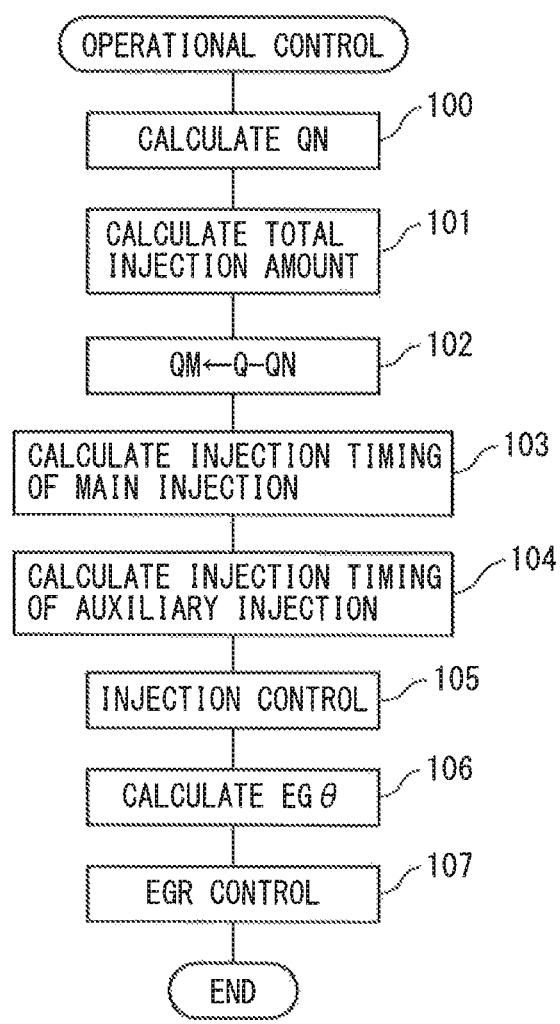

CONTROL SYSTEM OF COMPRESSION IGNITION TYPE INTERNAL COMBUSTION ENGINE

TECHNICAL FIELD

The present invention relates to a control system of a compression ignition type internal combustion engine.

BACKGROUND ART

Known in the art is a compression ignition type internal combustion engine designed to ignite main injection fuel by premixed charge compression ignition, wherein main fuel is injected at a relatively early timing of the compression stroke and auxiliary fuel is injected around when a cool flame reaction of the main fuel starts, so as to thereby lower the temperature of the premixed charge of the main fuel by latent heat of vaporization of the auxiliary fuel and delay the timing of transition from, the cool flame reaction to hot flame reaction of the main fuel, that is, the ignition timing of the main fuel (for example, see Japanese Patent Publication No. 2004-3439A).

In this compression ignition type internal combustion engine, the ignition timing of the main fuel is controlled to the target ignition timing by controlling the amount of auxiliary fuel.

SUMMARY OF INVENTION

Technical Problem

In this way, by injecting the auxiliary fuel after the completion of an injection of the main fuel, it is possible to control the ignition timing of the main fuel. An object of the present invention is to provide a control system of a compression ignition type internal combustion engine designed to control the ignition timing of main injection fuel by a method completely different from this.

Solution to Problem

That is, according to the present invention, there is provided a control system of a compression ignition type internal combustion engine comprising a fuel injector arranged in a combustion chamber and an electronic control unit controlling a fuel injection action from the fuel injector, a main injection fuel injected from the fuel injector being ignited by a premixed charge compression ignition, wherein the electronic control unit is configured to start an injection of the main injection fuel from the fuel injector within a range of crank angle from 10 degree before the compression top dead center to 10 degree after the compression top dead center and make a smaller amount of auxiliary injection fuel than the main injection fuel be injected from the fuel injector before the main injection fuel to ignite the auxiliary injection fuel by the premixed charge compression ignition, and the electronic control unit is further configured to control an injection timing of the auxiliary injection fuel to an injection timing whereby the premixed charge compression ignition of the main injection fuel is caused by a heat generated by the premixed charge compression ignition of the auxiliary injection fuel after a start of injection of the main injection fuel.

Advantageous Effect of Invention

In the new method according to the present invention, a smaller amount of auxiliary injection fuel than the main injection fuel is injected from the fuel injector before the main injection fuel. This auxiliary injection fuel is ignited by premixed charge compression ignition. After the injection of the main injection fuel is started, the heat generated by the premixed compression ignition of the auxiliary injection fuel causes premixed charge compression ignition of the main injection fuel. Due to this, the premixed charge compression ignition timing of the main injection fuel stabilizes.

BRIEF DESCRIPTION OF DRAWINGS

FIG. 10 is a flow chart for engine operational control.

DESCRIPTION OF EMBODIMENTS

Figure 1:
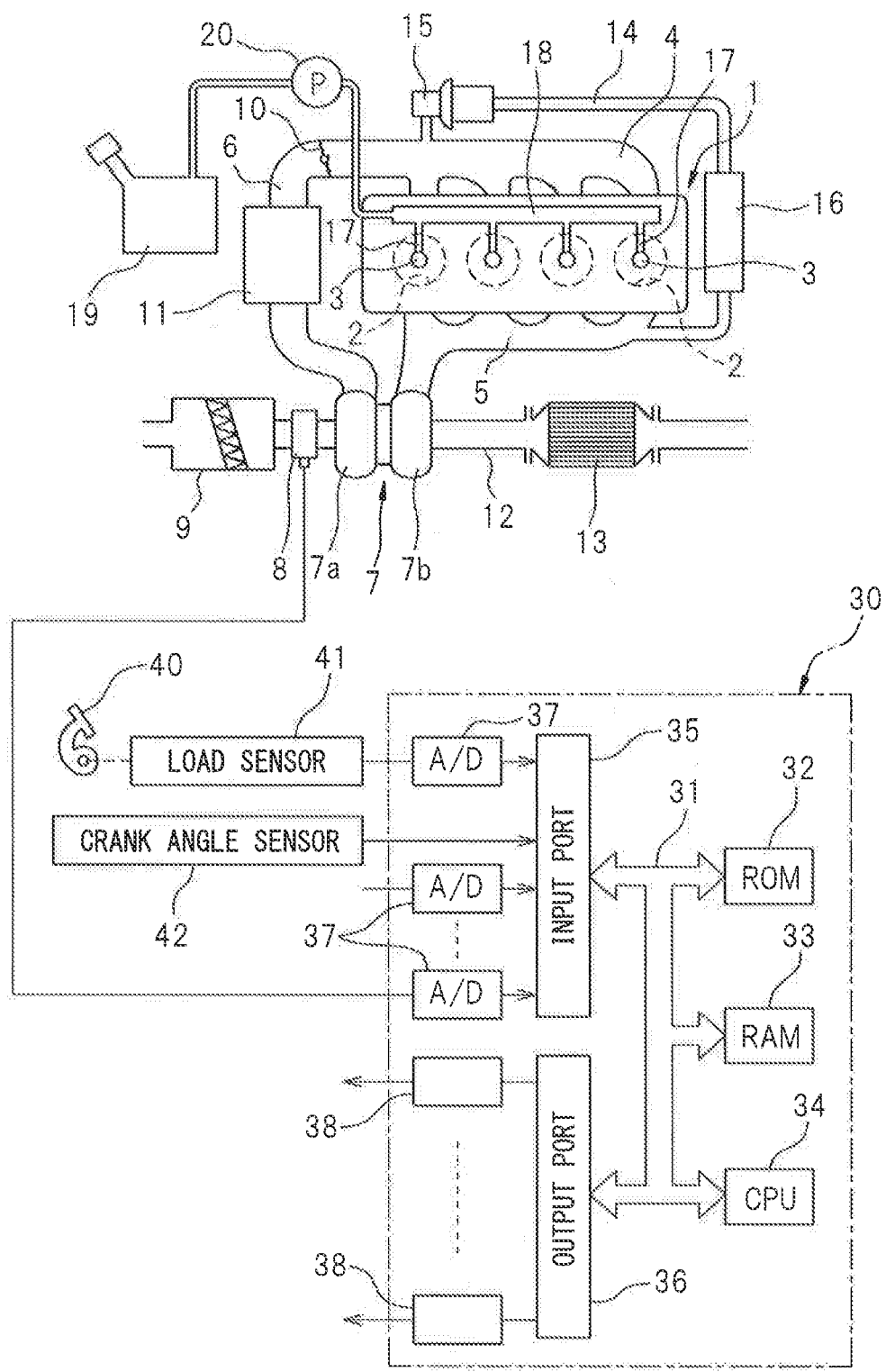
FIG. 1 is an overview of a compression ignition type internal combustion engine.

FIG. 1 shows an overall view of a compression ignition type internal combustion engine. Referring to FIG. 1, 1 indicates an engine body, 2 a combustion chamber of a cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust, turbocharger 7. The inlet, of the compressor 7a is connected through an intake air amount detector 8 to an air cleaner 9. Inside of the intake duct 6, a throttle valve 10 driven by an actuator is arranged. Around the intake duct 6, an intercooler 11 is arranged for cooling the intake air flowing through the inside of the intake duct 6.

On the other hand, the exhaust manifold 5 is connected to the inlet of an exhaust turbine 7b of the exhaust turbocharger 7. The outlet of the exhaust turbine 7b is connected through an exhaust pipe 12 to an exhaust aftertreatment device 13 containing therein an exhaust purifying catalyst or particulate filter. The exhaust manifold 5 and the intake manifold 4 are connected with each other through an exhaust gas recirculation (hereinafter referred to as an "EGR") passage 14. Inside the EGR passage 14, an electronic control type EGR control valve 15 is arranged. Around the EGR passage 14, an EGR cooler 16 is arranged for cooling the EGR gas flowing through the inside of the EGR passage 14. Further, each fuel injector 3 is connected through a fuel branch pipe 17 to a common rail 18. The fuel inside a fuel tank 19 is supplied by a fuel pump 20 to the inside of the common rail 18. The fuel inside the common rail 18 is injected through the fuel branch pipes 17 from the fuel injectors 3 to the combustion chambers 2.

The electronic control unit 30 is comprised of a digital computer provided with a ROM (read only memory) 32, RAM (random access memory) 33, CPU (microprocessor) 34, input port 35, and output port 36, which are interconnected with each other by a bidirectional bus 31. As shown in FIG. 1, the output signal of the intake air amount detector 8 is input through a corresponding AD converter 37 to the input port 35. Further, an accelerator pedal 40 is connected to a load sensor 41 generating an output voltage proportional to the amount of depression of the accelerator pedal 40. The output voltage of the load sensor 41 is input through a corresponding AD converter 37 to the input port 35. Furthermore, the input port 35 is connected to a crank angle sensor 42 generating an output pulse each time a crankshaft, rotates by for example 30°. On the other hand, the output port 36 is connected through corresponding drive circuits 38 to the fuel injectors 3, EGR control valve 15, and fuel pump 20.

Figure 2:
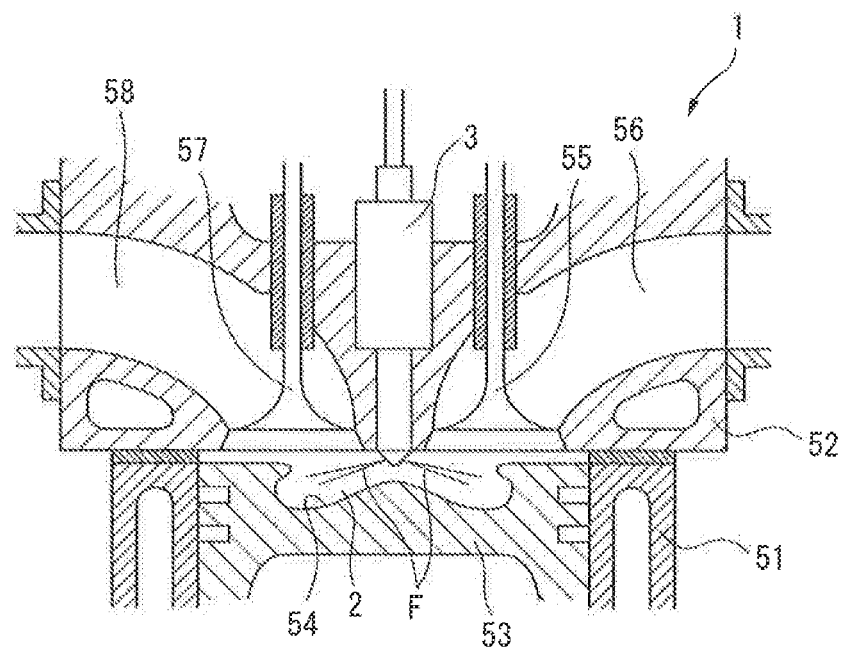
FIG. 2 is a cross-sectional view of an engine body.
Figure 3:
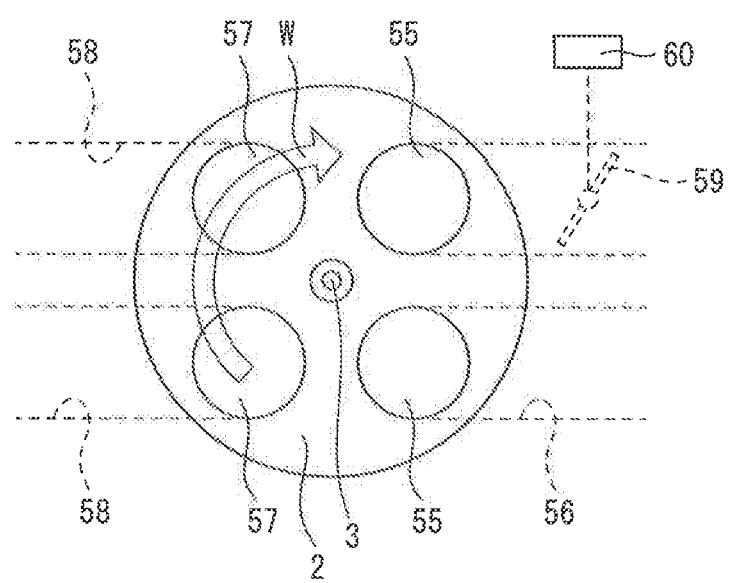
FIG. 3 is a bottom view of a top wall of a combustion chamber shown in FIG. 2.

FIG. 2 is a cross-sectional view of an engine body 1 shown in FIG. 1, while FIG. 3 is a bottom view of a top wall of the combustion chamber 2 shown in FIG. 2. Note that in FIG. 2 and FIG. 3, 51 indicates a cylinder block, 52 a cylinder head attached to the cylinder block 51, 53 a piston reciprocally moving in the cylinder block 51, 54 a cavity formed at a top surface of a piston 53, 55 a pair of intake valves, 56 a pair of intake ports, 57 a pair of exhaust valves, and 58 exhaust ports. As shown in FIG. 3, each fuel injector 3 is arranged at the center of the top wall of the combustion chamber 2. Fuel F is injected from the fuel injector 3 toward the periphery inside the cavity 54 formed on the top surface of the piston 53.

Further, the internal combustion engine shown in FIG. 1, as shown in FIG. 3, is provided with a swirl control device comprising a swirl control valve 59 arranged in one of the intake ports 56 and an actuator 60 for driving this swirl control valve 59. This actuator 60 is connected through a corresponding drive circuit 38 to the output port 36. If the swirl control valve 53 is made to close, the intake air flows through one of the intake ports 56 into the combustion chamber 2. As a result, inside the combustion chamber 2, a swirl flow is generated such as shown by the arrow W in FIG. 3. This swirl flow W becomes stronger the larger the degree of closing of the swirl control valve 59.

Figure 4:
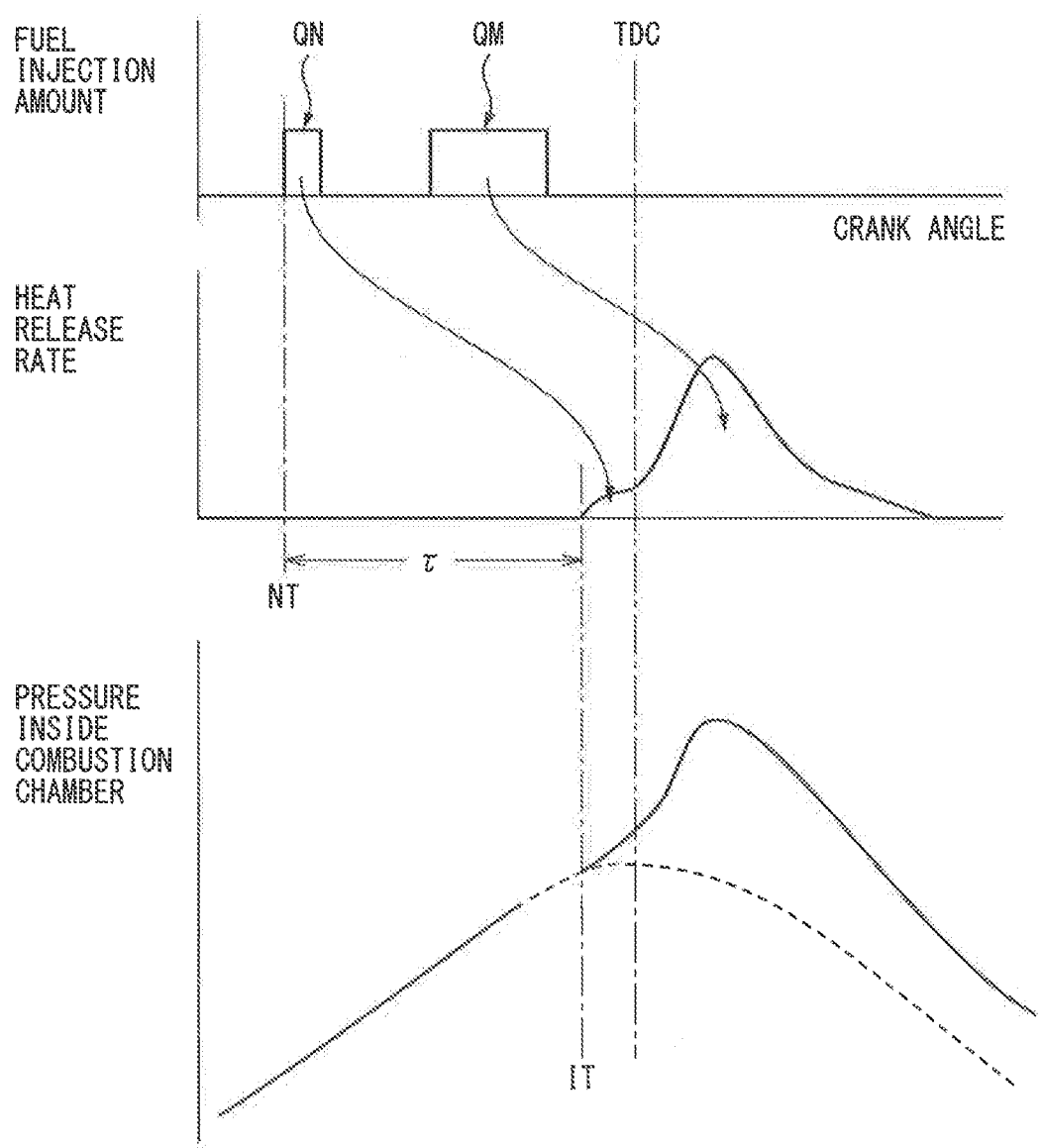
FIG. 4 is; a view showing a fuel injection amount, heat release rate, and change in pressure in a combustion chamber.

Next, while referring to FIG. 4, the injection control according to the present invention will be explained. Note that, FIG. 4 shows a fuel injection amount from the fuel injector 3, heat release rate, and change in pressure in the combustion chamber 2. In an embodiment shown in FIG. 4, an action of injection of the main injection fuel QM from the fuel injector 3 for generating engine output is started at a crank angle before the compression top dead center and after 10 degree before the compression top dead center. This action of injection of the main injection fuel QM from the fuel injector 3 is made to end during the compression stroke before the compression top dead center TDC. On the other hand, in the embodiment shown in FIG. 4, a smaller amount of auxiliary injection fuel QN than the main injection fuel QM is injected from the fuel injector 3 during the compression stroke before the main injection fuel QM. This auxiliary injection fuel QN forms a premixed charge at the periphery inside the cavity 54. This premixed charge formed at the periphery inside the cavity 54 is made to ignite before the compression top dead center TDC. If the premixed charge formed at the periphery inside the cavity 54 is made to ignite, that is, if a hot flame reaction is started, the temperature inside the combustion chamber 2 rapidly rises by 50° C. to 100° C. or so. This temperature rise triggers the premixed charge combustion ignition of the main injection fuel QM.

In this regard, in a compression ignition type internal combustion engine, if the ignition timing of the main injection fuel QM deviates from the optimum timing, various problems arise. For example, if the ignition timing of the main injection fuel QM becomes earlier than the optimum timing, the problem will arise that the heat release rate will rapidly increase and a combustion noise will be caused, while conversely if the ignition timing of the main injection fuel QM becomes delayed from the optimum timing, the problem will arise that an engine output will fall or a misfire will occur and a torque fluctuation will occur. Therefore, in the present invention, to stabilize the ignition timing of the main injection fuel QM, the auxiliary injection fuel QN is injected before the injection action of the main injection fuel QM and the heat generated by the premixed charge compression ignition of the auxiliary injection fuel QN is used to cause the premixed charge compression ignition of the main injection fuel QM. For this reason, in the embodiment shown in FIG. 4, the injection timing NT of the auxiliary injection fuel QN is controlled to an injection timing whereby the premixed charge compression ignition of the main injection fuel QM is caused by the heat generated by the premixed charge compression ignition of the auxiliary injection fuel QN after the completion of injection of the main injection fuel QM.

That is, in the embodiment shown in FIG. 4, a control system of a compression ignition type internal combustion engine comprises the fuel injector 3 arranged in the combustion chamber 2 and the electronic control unit 30 controlling a fuel injection action from the fuel injector 3, and the main injection fuel QM injected from the fuel injector 3 is ignited by the premixed charge compression ignition. The electronic control unit 10 is configured to start the injection of the main injection fuel QM from the fuel injector 3 at a crank angle before the compression top dead center and after 10 degree before the compression top dead center and make a smaller amount of the auxiliary injection fuel QN than the main injection fuel QM be injected from the fuel injector 3 before the main injection fuel QM to ignite the auxiliary injection fuel QN by the premixed charge compression ignition. Furthermore, the electronic control unit 10 is configured to control the injection timing NT of the auxiliary injection fuel QN to an injection timing whereby the premixed charge compression ignition of the main injection fuel QM is caused by the heat generated by the premixed charge compression ignition of the auxiliary injection fuel QN after the completion of injection of the main injection fuel QM.

Figure 5:
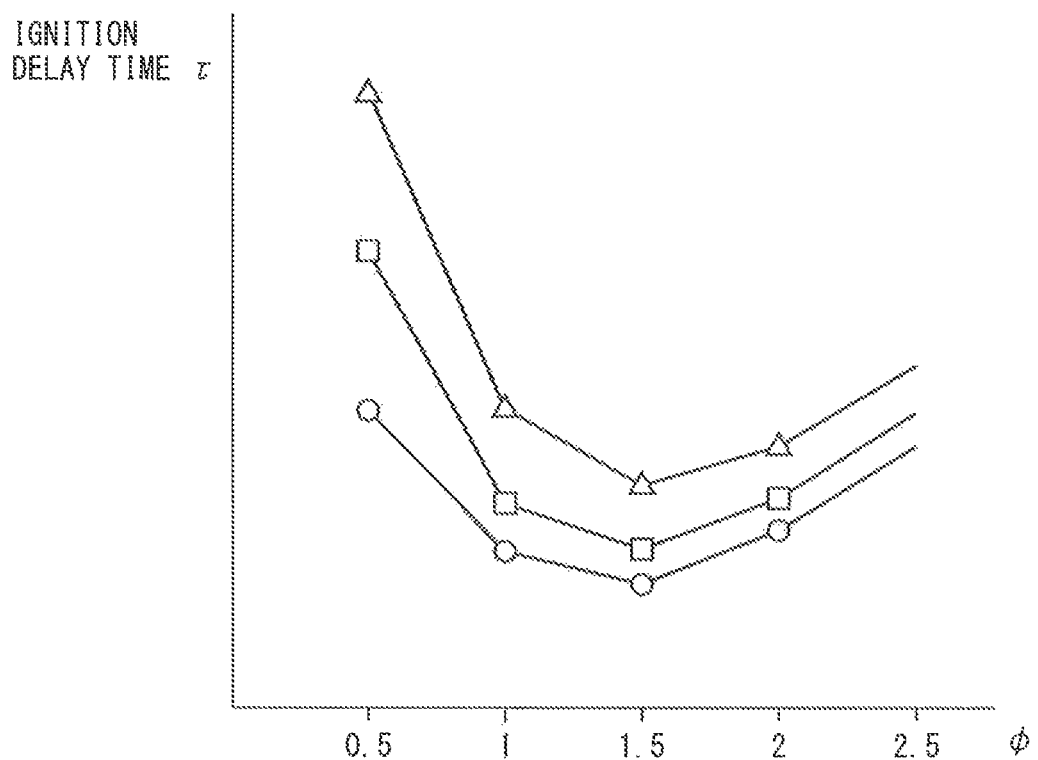
FIG. 5 is a view showing an ignition delay time $\tau$.

In this regard, in this case, to stabilize the ignition timing of the main injection fuel QM, it is necessary to stabilize the premixed charge compression ignition timing of the auxiliary injection fuel QN. Next, this will be explained with reference to FIG. 5. Now then, an injected fuel is ignited by the premixed charge compression ignition when the temperature inside the combustion chamber becomes 900K to 950K. FIG. 5 shows the results of calculation of the ignition delay time τ of the premixed charge at this time. Note that, in FIG. 5, Φ shows the equivalent ratio of the premixed charge. In FIG. 5, the points shown by triangle, square, and circle show the relationships between the equivalent ratio Φ and ignition delay time τ when changing the concentration of oxygen in the combustion chamber. Note that, triangle, square, and circle respectively show the cases where the concentrations of oxygen are 2.5 mg/cm$^3$, 2.0 mg/cm$^3$, and 1.5 mg/cm$^3$. Further, the equivalent ratio Φ of 1.0 shows that the ratio of fuel and air is 1.0, that is, the premixed charge is the stoichiometric air-fuel ratio. The equivalent ratio Φ<1.0 shows that the air is in excess, that is, the premixed charge is lean, while the equivalent ratio Φ>1.0 shows that the fuel is in excess, that is, the premixed charge is rich.

Referring to FIG. 5, when, as shown by the equivalent ratio Φ=0.5, the premixed charge is lean, the ignition delay time τ becomes considerably long. Further, the ignition delay time τ greatly changes if the concentration of oxygen changes. In this case, the ignition delay time τ being long means that the premixed charge is hard to ignite. If the premixed charge becomes hard to ignite, the compression ignition timing of the premixed charge will end up widely varying. Further, the concentration of oxygen causing the ignition delay time τ to greatly change means the compression ignition timing of the premixed charge greatly changes due to the concentration of oxygen. Therefore, if in this way the ignition delay time τ becomes considerably long and further the ignition delay time τ greatly changes due to the concentration of oxygen, when the concentration of oxygen changes, for example, when the EGR rate changes and the concentration of oxygen changes, the compression ignition timing of the premixed charge will change extremely greatly.

On the other hand, if the equivalent, ratio Φ becomes 1.0 or larger than 1.0, that is, if the premixed charge becomes the stoichiometric air-fuel ratio or rich, sufficient fuel will be present, so the premixed charge will more easily ignite compared with when it is lean. At this time, as shown in FIG. 5, the ignition delay time τ becomes considerably short. Further, the change of the ignition delay time τ when the concentration of oxygen changes becomes smaller. In this way, if the premixed charge easily ignites by compression, the variation in the compression ignition timing of the premixed charge becomes smaller. Further, the change of the ignition delay time τ when the concentration of oxygen changes becomes smaller, so, for example, even when the EGR rate changes and the concentration of oxygen changes, the fluctuation of the compression ignition timing of the premixed charge becomes smaller. On the other hand, if the equivalent ratio Φ becomes larger than 2.0, the latent heat of evaporation of the fuel will cause the ambient temperature to fail and the premixed charge to become harder to ignite. As a result, the ignition delay time τ will become longer.

That is, as will be understood from FIG. 5, when the equivalent ratio Φ is between 1.0 and 2.0, the ignition delay time τ becomes shorter. Further, the change of the ignition delay time τ when the concentration of oxygen changes becomes smaller. Therefore, in this case, since, even if the concentration of oxygen changes, the compression ignition timing of the premixed charge will not change much at all and the premixed charge will become much easier to ignite, the compression ignition timing of the premixed gas will no longer vary much at all. Therefore, when the equivalent Φ is between 1.0 to 2.0, for example, even if the EGR rate changes and the concentration of oxygen greatly changes, the compression ignition timing of the premixed charge will not change much at all.

Therefore, if premixed charge with the equivalent ratio Φ of 1.0 to 2.0 is formed inside the cavity 54 of the piston 53 near the compression top dead center TDC, and this premixed charge ignite by compression, even if the EGR rate changes and the concentration of oxygen greatly changes, the compression ignition timing of the premixed charge will not change almost at all. Therefore, if forming premixed charge with the equivalent ratio Φ of 1.0 to 2.0 inside the cavity 54 of the piston 53 before the premixed charge of the main injection fuel QM is ignited by compression, making this premixed charge ignite by compression before the main injection fuel QM is ignited, and using the heat generated by this compression ignition of the premixed charge to cause the premixed charge compression ignition of the main injection fuel QM, even if the EGR rate changes and the concentration of oxygen greatly changes, the premixed charge compression ignition timing of the main injection fuel QM will not fluctuate much at all. That is, the ignition timing of the main injection fuel QM will become stable.

Figure 6:
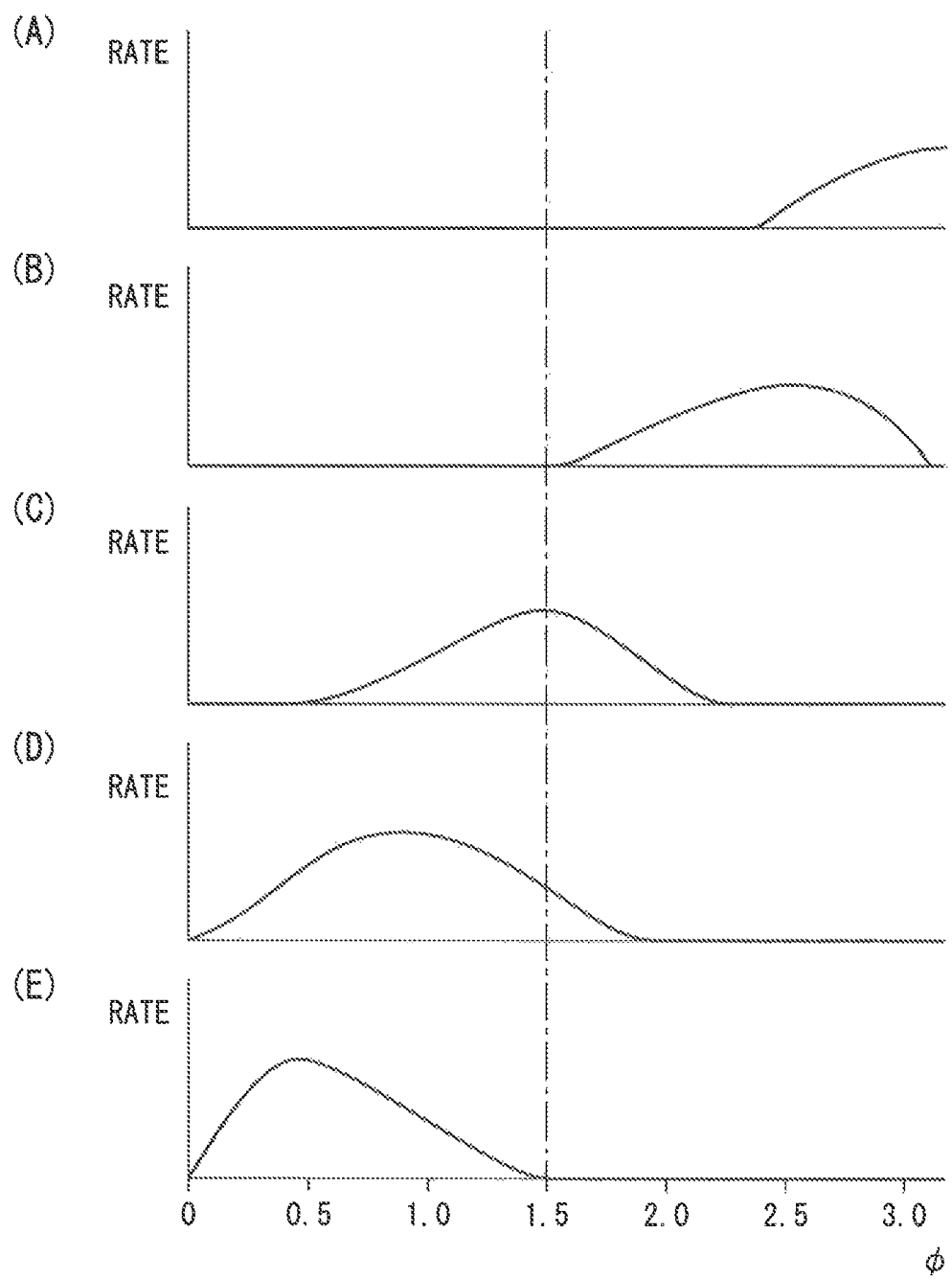
FIG. 6 is a view for explaining a change of an equivalent ratio $\Phi$ of a premixed charge.

Therefore, in the embodiment according to the present invention, the auxiliary injection fuel QN injected before the main injection fuel QM is used to form premixed charge with the equivalent ratio Φ of 1.0 to 2.0 inside the cavity 54 of the piston 53. Next, referring to FIG. 6, the method of forming premixed charge with the equivalent ratio Φ of 1.0 to 2.0 inside the cavity 54 of the piston 53 will be explained. Note that, in FIG. 6, the abscissas show the value of the equivalent ratio Φ of the premixed charge in the cavity 54 of the piston 53, and the ordinates show rates or percentages of the premixed charge with the equivalent ratio Φ (hereinafter referred to as a rate of the equivalent ratio). In addition, each curve in FIG. 6 shows the distribution of the rate of equivalent ratio. Further, in FIG. 6, (A), (B), (C), (D), and (E) show the change in the rates of equivalent ratio for each elapse of a certain time period after injection of the auxiliary injection fuel QN. As will be understood, from (A), (B), (C), (D), and (E) in FIG. 6, the rates of equivalent ratio of premixed charge formed inside the cavity 54 of the piston 53 are spread in peak shapes, and each curve extends over a broad range of the equivalent ratio Φ.

(A) in FIG. 6 shows the rate of the equivalent ratio right after injection of the auxiliary injection fuel QN. As will be understood from (A) in FIG. 6, at this time, the equivalent ratio Φ of the premixed charge formed at the periphery inside the cavity 54 becomes a large value overall. Next, the injected fuel of the auxiliary injection fuel QN gradually disperses at the periphery inside the cavity 54, so the equivalent ratio Φ of the premixed charge becomes smaller overall. If becoming the state of (B) in FIG. 6 then the state of (C) in FIG. 6, the rate of the premixed charge with the equivalent ratio Φ of 1.0 to 2.0 becomes the largest. Next, if further time elapses, as shown in (D) and (E) in FIG. 6, the equivalent ratio Φ of the premixed charge becomes further smaller overall.

As explained above, to stabilize the ignition timing of the main injection fuel QM, it is necessary to form premixed charge with the equivalent ratio Φ of 1.0 to 2.0 in the cavity 54. However, in actuality, it is difficult to form premixed charge of only the equivalent ratio Φ of 1.0 to 2.0 in the cavity 54. Therefore, in the present invention, premixed charge containing as much premixed charge with the equivalent ratio Φ of 1.0 to 2.0 as possible is made to be formed in the cavity 54. As explained above, premixed charge with the equivalent ratio Φ of 1.0 to 2.0 becomes easiest to ignite, and therefore, even if there is premixed charge with the equivalent ratio Φ outside of 1.0 to 2.0, so long as there is a certain extent of premixed charge with the equivalent ratio Φ of 1.0 to 2.0 present, the premixed charge with the equivalent ratio Φ of 1.0 to 2.0 easily ignites. Accordingly, in order to stabilize the ignition timing of the main injection fuel QM, it is sufficient to form premixed charge containing as much premixed charge with the equivalent ratio Φ of 1.0 to 2.0 as possible in the cavity 54.

Therefore, in the present invention, premixed charge in the state shown in (C) in FIG. 6, that is, premixed charge whereby the rate of the premixed charge with the equivalent ratio Φ of 1.0 to 2.0 becomes the greatest, is formed inside the cavity 54. In this case, the timing at which such premixed charge in the cavity 54 should be formed is the compression ignition timing of the auxiliary injection fuel QN, and the target compression ignition timing targeted for this compression ignition timing of the auxiliary injection fuel QN is shown in FIG. 4 by IT. FIG. 4 shows the case of controlling the injection timing NT of the auxiliary injection fuel QN to an injection timing whereby the compression ignition timing of the auxiliary injection fuel QN becomes this target compression ignition timing IT. In this case, as shown in FIG. 4, the premixed charge compression ignition of the auxiliary injection fuel QN causes the heat release rate to rise. Next, the premixed charge compression ignition of the main injection fuel QM causes the heat release rate to further rise.

In the embodiment shown in FIG. 4, this target compression ignition timing IT is set in advance based on experiments between the time of completion of injection of the main injection fuel QN and the compression top dead center TDC. Therefore, in the embodiment shown in FIG. 4, the target compression ignition timing of the auxiliary injection fuel QN for causing the premixed charge compression ignition of the main injection fuel QM at a predetermined timing is preset between the time of completion of injection of the main injection fuel QN and the compression top dead center TDC, and the electronic control unit 30 is configured to control the injection timing NT of the auxiliary injection fuel QN to an injection timing by which the premixed charge compression ignition timing of the auxiliary injection fuel QN becomes the target compression ignition timing IT. In this case, in the embodiment shown in FIG. 4, the rate of the premixed charge with the equivalent ratio Φ of 1.0 to 2.0 in the premixed charge produced by the auxiliary injection fuel QN becomes maximum at the target compression ignition timing IT.

In this regard, as explained above, (A), (B), (C), (D), and (E) in FIG. 6 show changes in the rate of equivalent ratio after the elapse of each certain time period after injection of the auxiliary injection fuel QN, and if a fixed time period elapses after injection of the auxiliary injection fuel QN, the rate of the equivalent ratio of the premixed charge becomes the state shown in (C) of FIG. 6, that is, it becomes a state where the ratio of the premixed charge with the equivalent ratio Φ of 1.0 to 2.0 becomes largest. In this case, if the fixed time period elapses after the injection of the auxiliary injection fuel QN, due to dispersion of the auxiliary injection fuel QN, the rate of the equivalent ratio of the premixed charge becomes the state shown in (C) of FIG. 6, and at this time, the action of dispersion of the auxiliary injection fuel QN is not affected much at all by the temperature or the concentration of oxygen. Therefore, regardless of the engine operating state, if the fixed time period elapses after injection of the auxiliary injection fuel QN, the rate of the equivalent ratio of the premixed charge becomes the state shown in (C) of FIG. 6, that is, it becomes a state where the rate of the premixed charge with the equivalent ratio Φ of 1.0 to 2.0 becomes the largest.

On the other hand, the timing at which the premixed charge should be formed in the cavity 54 in a state where the rate of the premixed charge with the equivalent ratio Φ of 1.0 to 2.0 becomes the largest is the target compression ignition timing IT of the auxiliary injection fuel QN. Therefore, the above-mentioned fixed time period is the time period τ from when the auxiliary injection fuel QN is injected to when the crank angle reaches the target compression ignition timing IT in FIG. 4, that is, expresses the ignition delay time τ of the auxiliary injection fuel QN. In this case, if setting the injection timing NT of the auxiliary injection fuel QN so that the time period τ from when the auxiliary injection fuel QN is injected to when the crank angle reaches the target compression ignition timing IT, that is, the ignition delay time τ of the auxiliary injection fuel QN, becomes constant, the rate of the premixed charge with the equivalent ratio Φ of 1.0 to 2.0 becomes the largest at the target compression ignition timing IT regardless of the engine operating state. As explained above, if the rate of the premixed charge with the equivalent ratio Φ of 1.0 to 2.0 becomes the largest, the premixed charge becomes extremely easily ignitable in state, and herefore, the auxiliary injection fuel QN can be made to ignite at the target compression ignition timing IT.

Figure 7:
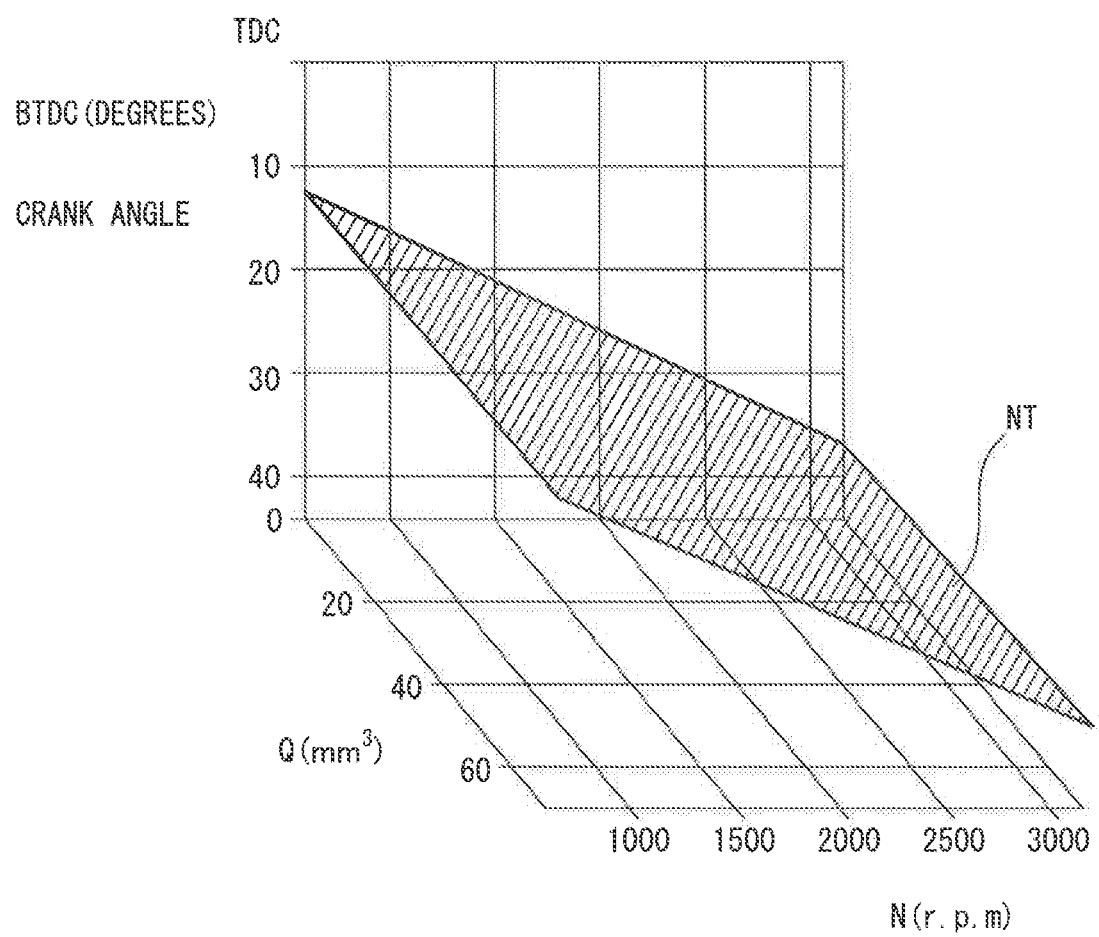
FIG. 7 is a view showing an injection timing of auxiliary injection fuel.

Therefore, in the embodiment according to the present invention, the injection timing NT of the auxiliary injection fuel QN is set so that the time period τ from when the auxiliary injection fuel QN is injected to when the crank angle reaches the target compression ignition timing IT becomes constant. The injection timing NT of the auxiliary injection fuel QN in this case is shown by the hatched plane in FIG. 7. Note that, FIG. 7 shows a three dimensional map having the total injection amount Q, engine speed N, and crank angle as coordinate axes. If setting the injection timing NT of the auxiliary injection fuel QN so that the time period τ from when the auxiliary injection fuel QN is injected to when the crank angle reaches the target compression ignition timing IT becomes constant, the higher the engine speed N becomes, the earlier the injection timing NT of the auxiliary injection fuel QN is made. Therefore, as shown by the hatched plane in FIG. 7, the higher the engine speed N becomes, the more the injection timing NT of the auxiliary injection fuel QN is advanced. In this case, in the example shown in FIG. 7, the injection timing NT of the auxiliary injection fuel QN is advanced proportionally to the increase of the engine speed N. Note that, in this case, as will be understood from FIG. 7, the injection timing NT of the auxiliary injection fuel QN will not change even if the total fuel injection amount Q changes so long as the engine speed N is the same.

In this regard, as explained above, in the example shown in FIG. 7, the injection timing NT of the auxiliary injection fuel QN is controlled so that the rate of the premixed charge with the equivalent ratio Φ of 1.0 to 2.0 becomes the maximum at the target compression ignition timing IT. However, even if the rate of the premixed charge with the equivalent ratio Φ of 1.0 to 2.0 does not become maximum at the target compression ignition timing IT, if the rate of the premixed charge with the equivalent ratio Φ of 1.0 to 2.0 becomes large enough to a certain extent, that is, if the rate of the premixed charge with the equivalent ratio Φ of 1.0 to 2.0 becomes a certain rate or more at the target compression ignition timing IT, the auxiliary injection fuel QN can be made to ignite by compression at the target compression ignition timing IT. In this case, the injection timing NT of the auxiliary injection fuel QN is advanced the higher the engine speed N so that the rate of the premixed charge with the equivalent ratio of 1.0 to 2.0 in the premixed charge produced due to the auxiliary injection fuel QN becomes a constant rate or more at the target compression ignition timing IT.

Now then, if the injection timing NT of the auxiliary injection fuel QN is set in the hatched plane in the three dimensional map of FIG. 7, the rate of the premixed charge with the equivalent ratio $\Phi$ of 1.0 to 2.0 will become the largest at the target compression ignition timing IT, and the auxiliary injection fuel QN can be made to ignite by compression at the target compression ignition timing IT. However, the ignition timing of the auxiliary injection fuel QN is affected by the temperature inside the combustion chamber 2 or the change of the concentration of oxygen. Sometimes, the auxiliary injection fuel QN will ignite before the target compression ignition timing IT, that is, before the rate of the premixed charge with the equivalent ratio $\Phi$ of 1.0 to 2.0 becomes the largest. In this case, if raising the EGR rate to lower the concentration of oxygen inside the combustion chamber 2 and thereby suppress reaction of the injected fuel, the ignition timing of the auxiliary injection fuel QN will be delayed and the auxiliary injection fuel QN will be ignited by compression at the target compression ignition timing IT. Note that, as explained above, if the ratio of the premixed charge with the equivalent ratio $\Phi$ of 1.0 to 2.0 becomes larger, since the ignition timing of the auxiliary injection fuel QN is not be affected by a change in concentration of oxygen, even if raising the EGR rate in this way, the auxiliary injection fuel QN is ignited by compression at the target compression ignition timing IT.

Figure 8:
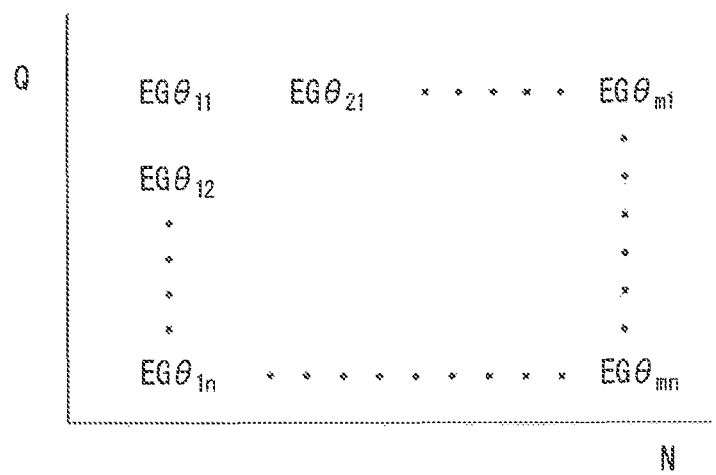
FIG. 8 is a view showing a map of an opening degree $EG\theta$ of an EGR control valve.
Figure 9:
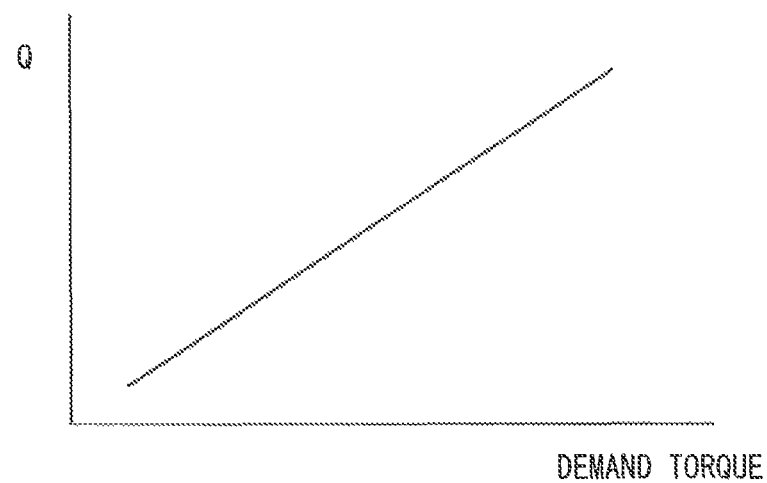
FIG. 9 is a view showing a relationship between a total fuel injection amount Q and an engine demand torque.

Of course, if the auxiliary injection fuel QN is made to ignite by compression at the target compression ignition timing IT even if not changing the EGR rate, there is no need to particularly change the EGR rate. However, depending on the engine operating state, sometimes the auxiliary injection fuel QN will be made to ignite before the target compression ignition timing IT. In this case, it becomes necessary to change the EGR rate in accordance with the engine operating state. In the embodiment according to the present invention, the EGR rate is changed in accordance with the engine operating state. For this purpose, the optimum opening degree EG$\theta$ of the EGR control valve 15 is stored as a function of the total injection amount Q and engine speed N in the form of the map such as shown in FIG. 8 in advance in the ROM 32. Note that, this total injection amount Q is made to increase proportionally to the demand torque of the engine as shown in FIG. 9.

Next, referring to FIG. 10, an operational control routine of an engine will be explained. Note that, this routine is executed by interruption every fixed time period.

Referring to FIG. 10, first, at step 100, the auxiliary injection fuel amount QN is calculated. Next, at step 101, the total fuel injection amount Q from the fuel injector 3 is calculated from the demand torque of the engine calculated based on the output signal of the load sensor 41. Next, at step 102, the auxiliary injection fuel amount QN is subtracted from the total fuel injection amount Q to calculate the main injection fuel amount QM. Next, at step 103, the injection timing of the main injection fuel QM is calculated.

Next, at step 104, the injection timing NT of the auxiliary injection fuel QN is calculated from the three dimensional map shown in FIG. 7. Next, at step 105, injection control of the main injection fuel QM and the auxiliary injection fuel QN from the fuel injector 3 is performed. Next, at step 106, the opening degree EG$\theta$ of the EGR control valve 15 is calculated from the map shown in FIG. 8. Next, at step 107, the EGR control valve 15 is controlled so that the opening degree $\theta$ of the EGR control valve 15 becomes the opening degree EG$\theta$ calculated at step 106.

Now then, in a compression ignition type internal combustion engine, generally speaking, if the temperature of the premixed charge becomes 800K to 850K, a cool flame reaction occurs, and if the temperature of the premixed charge exceeds about 950K, a hot flame reaction is started. On the other hand, as shown in FIG. 7, when the engine speed N is low, the injection timing NT of the auxiliary injection fuel QN is retarded. At this time, when the temperature inside the combustion chamber 2 is 800K to 850K or higher than 850K, the auxiliary injection fuel QN is injected. If fuel is injected when the temperature inside the combustion chamber 2 is 800K to 850K or higher than 850K in this way, around when the injected fuel becomes the premixed charge, the temperature inside the combustion chamber 2 becomes considerably higher than 850K. In this case, immediately after a cool flame reaction occurs, a hot flame reaction occurs. As a result, there is the danger of the fuel ending up igniting before the target compression ignition timing IT. However, in the embodiment shown in FIG. 7, when the engine speed is low, the main injection fuel QM is injected around when the cool flame reaction of the auxiliary injection fuel QN occurs. Therefore, the injected auxiliary injection fuel QN is cooled by the latent heat of vaporization of the main injection fuel QM. As a result, the occurrence of the hot flame reaction is delayed, so the air-fuel mixture of the auxiliary injection fuel QN is made to ignite at the target compression ignition timing IT.

Figure 11A:
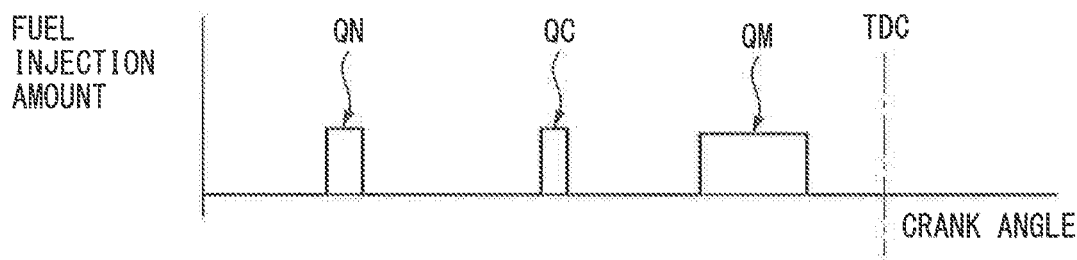
FIGS. 11A and 11B are views showing an injection timing of first auxiliary injection fuel QN and an injection timing of second auxiliary injection fuel QC.
Figure 11B:
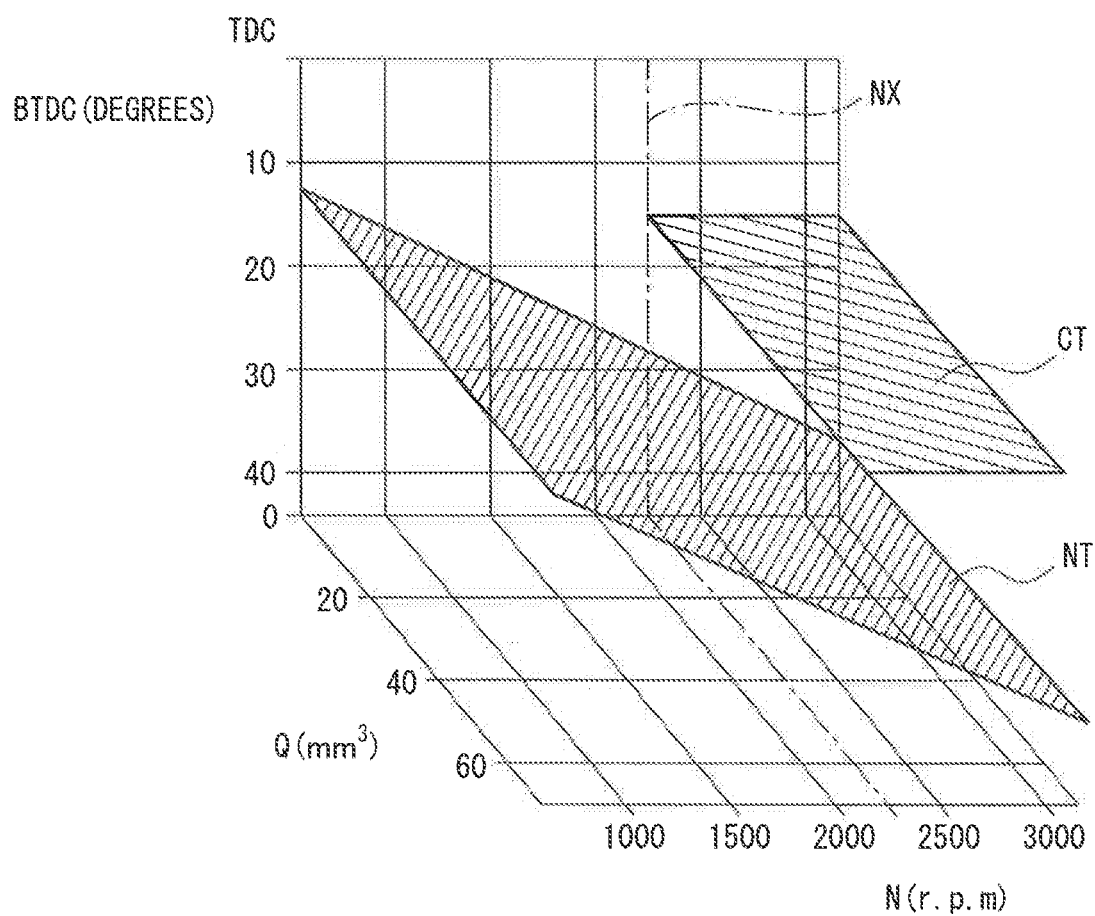

As opposed to this, as shown in FIG. 7, if the injection timing NT of the auxiliary injection fuel QN is made earlier as the engine speed N becomes higher, when the engine speed N becomes higher, the auxiliary injection fuel QN is injected when the temperature inside the combustion chamber 2 is lower than 800K. In this case, as explained above, if the temperature of the air-fuel mixture becomes 800K to 850K, since a cool flame reaction occurs and successively the reaction is shifted to a hot flame reaction, there is the danger that the premixed charge of the auxiliary injection fuel QN will end up igniting before the target compression ignition timing IT. Therefore, in a second embodiment of the present invention, as shown in FIG. 11A and FIG. 11B, a cooling-use fuel QC is injected after the auxiliary injection fuel QN is injected. Note that, the abscissa of FIG. 11A shows the crank angle, and FIG. 11B shows a three dimensional map similar to FIG. 7. Further, in FIG. 11B, CT shows the injection timing of the cooling-use fuel QC.

After the auxiliary injection fuel QN is injected, if the cooling-use fuel QC is injected, the latent heat of evaporation of the cooling-use fuel QC will cause a delay in the start of the hot flame reaction of the auxiliary injection fuel QN. As a result, the premixed charge of the auxiliary injection fuel QN can be made to ignite at the target compression ignition timing IT. Therefore, the injection timing CT of the cooling-use fuel QC is the timing when the temperature of the premixed charge of the auxiliary injection fuel QN becomes the start temperature of the cool flame reaction, that is, from 800K to 850K. This timing substantially matches the time at which the temperature inside the combustion chamber 2 becomes 800K to 850K. The time when the temperature inside the combustion chamber 2 becomes 800K to 850K is determined by the crank angle. Therefore, in the example shown in FIG. 11A and FIG. 11B, the cooling-use fuel QC is injected at a predetermined crank angle. In the second embodiment according to the present invention, as shown in FIG. 11A and FIG. 11B, when the engine speed N is higher than a predetermined speed NX, the cooling-use fuel QC is injected at a predetermined crank angle after the completion of the auxiliary injection fuel QN and before the start of injection of the main injection fuel QM.

Figure 12:
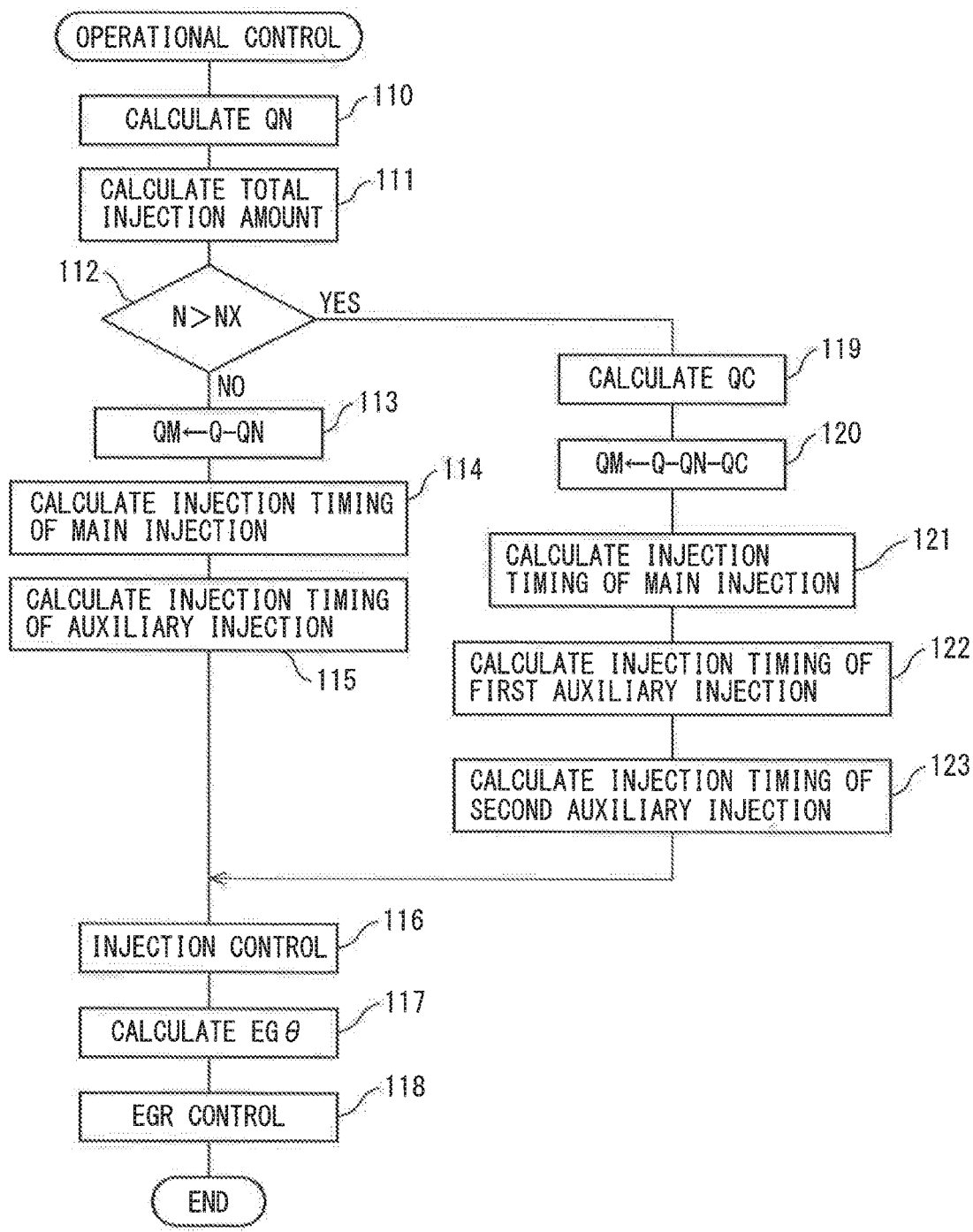
FIG. 12 is a flow chart of engine operational control.

FIG. 12 shows the operational control routine of an engine for working this second embodiment. Note that this routine is executed by interruption every fixed time period.

Referring to FIG. 12, first, at step 110, the auxiliary injection fuel amount QN is calculated. Next, at step 111, the total fuel injection amount Q from the fuel injector 3 is calculated from the demand torque of the engine calculated based on the output signal of the load sensor 41. Next, at step 112, it is judged if the engine speed N is higher than the predetermined speed NX. When the engine speed N is lower than the predetermined speed NX, the routine proceeds to step 113 where the auxiliary injection fuel amount QN is subtracted from the total fuel injection amount Q to calculate the main injection fuel amount QM. Next, at step 114, the injection timing of the main injection fuel QM is calculated.

Next, at step 115, the injection timing NT of the auxiliary injection fuel QN is calculated from the three dimensional map shown in FIG. 11B. Next, at step 116, injection control of the main injection fuel QM and the auxiliary injection fuel QN from the fuel injector 3 is performed. Next, at step 117, the opening degree EGθ of the EGR control valve 15 is calculated from the map shown in FIG. 8. Next, at step 118, the EGR control valve 15 is controlled so that the opening degree θ of the EGR control valve 15 becomes the opening degree EGθ calculated at step 117. At this time, the cooling-use fuel QC is not injected.

On the other hand, when at step 112 it is judged that the engine speed N is higher than the predetermined speed NX, the routine proceeds to step 119 where the cooling-use fuel amount QC, that is, the second auxiliary injection fuel amount QC, is calculated. Next, at step 120, the cooling-use fuel amount QC, that is, the second auxiliary injection fuel amount QC, and the first auxiliary injection fuel amount QN are subtracted from the total fuel injection amount Q to calculate the main injection fuel amount QM. Next, at step 121, the injection timing of the main injection fuel QM is calculated. Next, at step 122, the injection timing NT of the first auxiliary injection fuel QN is calculated from the three dimensional map shown in FIG. 11B. Next, at step 123, the injection timing CT of the cooling-use fuel amount QC, that is, the second auxiliary injection fuel QN, is calculated from the three dimensional map shown in FIG. 11B. Next, at step 116, injection control of the main injection fuel QM, the first auxiliary injection fuel QN, and the cooling-use fuel amount QC, that is, the second auxiliary injection fuel amount QC, from the fuel injector 3 is performed.

On the other hand, in the embodiment of the present invention, as shown in FIG. 3, the swirl control device comprising the swirl control valve 59 arranged inside one of the intake ports 56 and the actuator 60 for driving this swirl control valve 59 is provided, and by controlling the opening degree of the swirl control valve 59, the swirl flow W generated inside the combustion chamber 2 is controlled. In this case, if the swirl ratio is increased, that is, if the swirl flow W is strengthened, the auxiliary injection fuel QN quickly disperses, so the time period from when the auxiliary injection fuel QN is injected to when the air-fuel mixture of the auxiliary injection fuel QN ignites becomes shorter. Therefore, in a third embodiment according to the present invention, the more the swirl flow W is strengthened, the more the injection timing NT of the auxiliary injection fuel QN is retarded.

Figure 13:
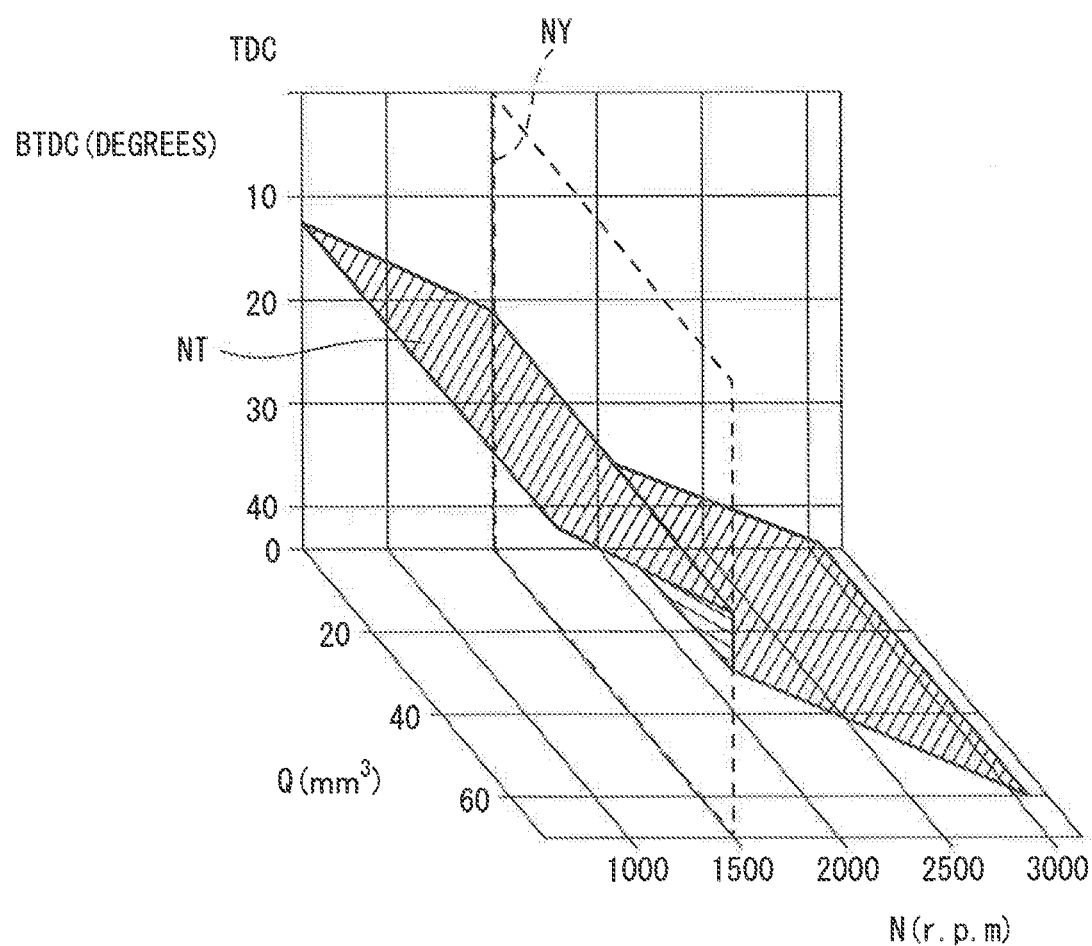
FIG. 13 is a view showing an injection timing of auxiliary injection fuel.

FIG. 13 shows a three dimensional map of this third embodiment. Referring to FIG. 13, in this example, when the engine speed N is lower than a predetermined speed NY, the swirl flow W is strengthened, while when the engine speed N is higher than the predetermined speed NY, the swirl flow W is weakened. Therefore, in this third embodiment, as shown in FIG. 13, when the engine speed N is lower than the predetermined speed NY, the injection timing NT of the auxiliary injection fuel QN is retarded.

Figure 14:
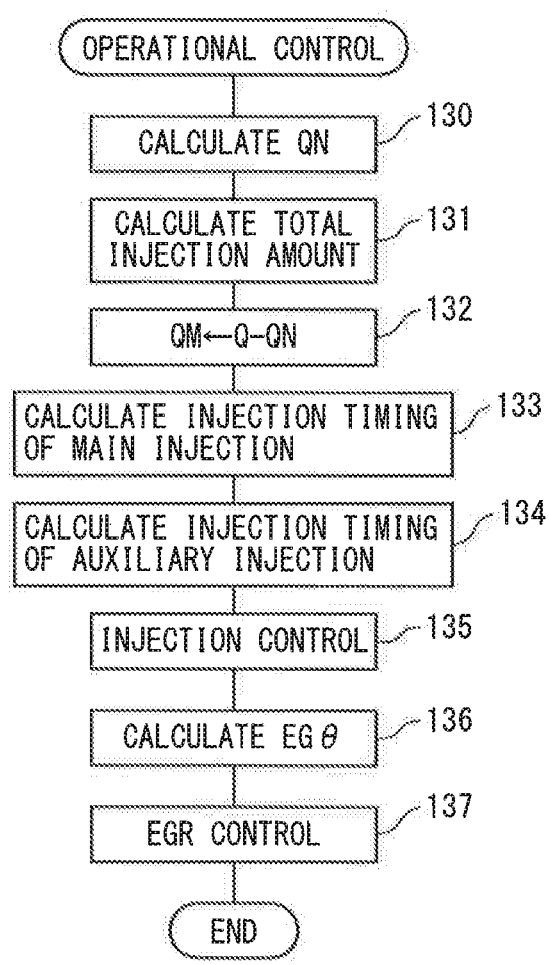
FIG. 14 is a flow chart for engine operational control.

FIG. 14 shows the operational control routine of an engine for working this third embodiment. This routine is executed by interruption every fixed time period.

The routine shown in this FIG. 14 is the same as the routine shown in FIG. 10. That is, referring to FIG. 14, first, at step 130, the auxiliary injection fuel amount QN is calculated. Next, at step 131, the total fuel injection amount Q from the fuel injector 3 is calculated from the demand torque of the engine calculated based on the output signal of the load sensor 41. Next, at step 132, the auxiliary injection fuel amount QN is subtracted from the total fuel injection amount Q to calculate the main injection fuel amount QM. Next, at step 133, the injection timing of the main injection fuel QM is calculated.

Next, at step 134, the injection timing NT of the auxiliary injection fuel QN is calculated from the three dimensional map shown in FIG. 13. Next, at step 135, injection control of the main injection fuel QM and the auxiliary injection fuel QN from the fuel injector 3 is performed. Next, at step 136, the opening degree EGθ of the EGR control valve 15 is calculated from the map shown in FIG. 8. Next, at step 137, the EGR control valve 15 is controlled so that the opening degree θ of the EGR control valve 15 becomes the opening degree EGθ calculated at step 136.

Figure 15:
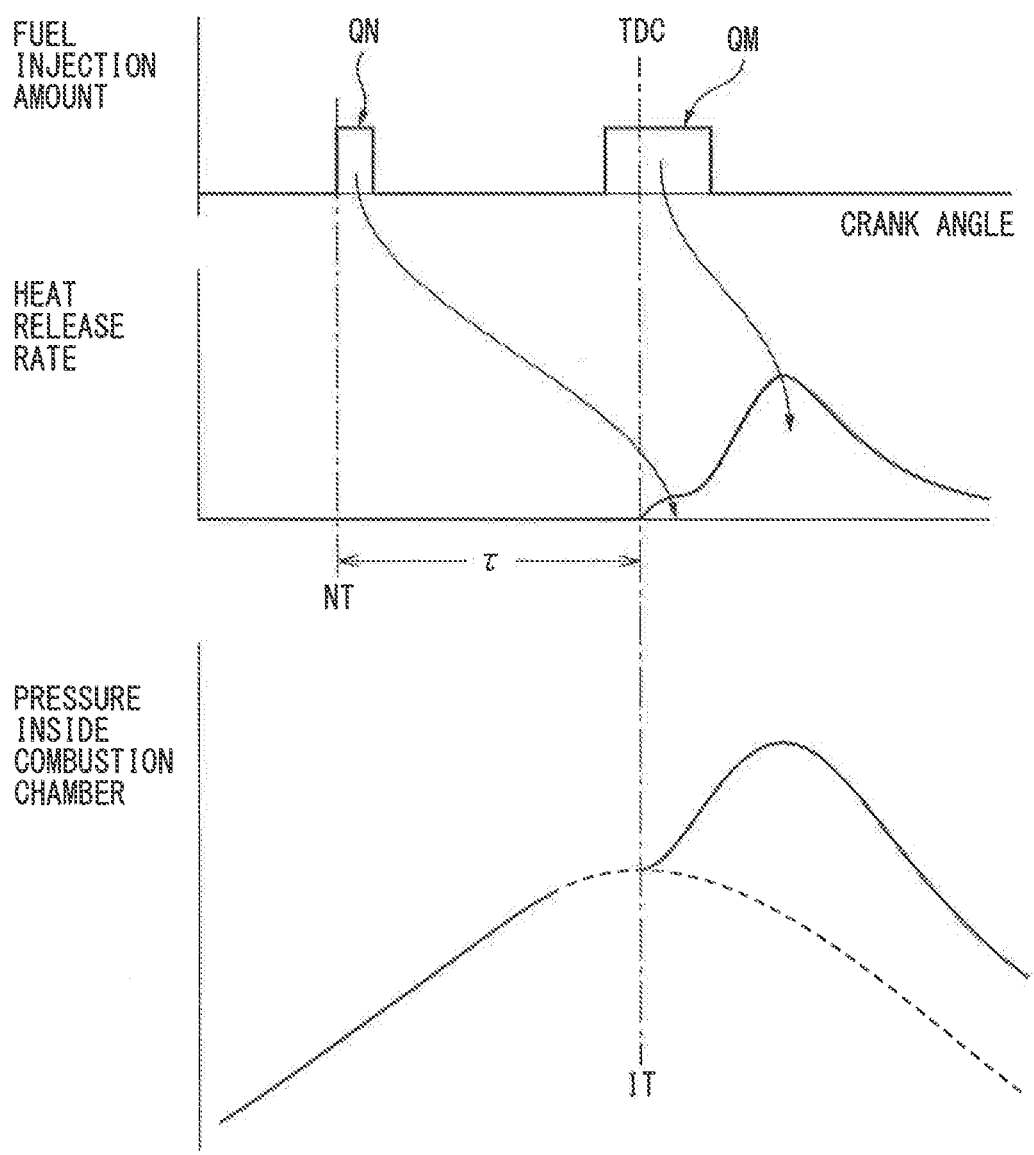
FIG. 15 is a view showing a fuel injection amount, heat release rate, and change in pressure in a combustion chamber.
Figure 16:
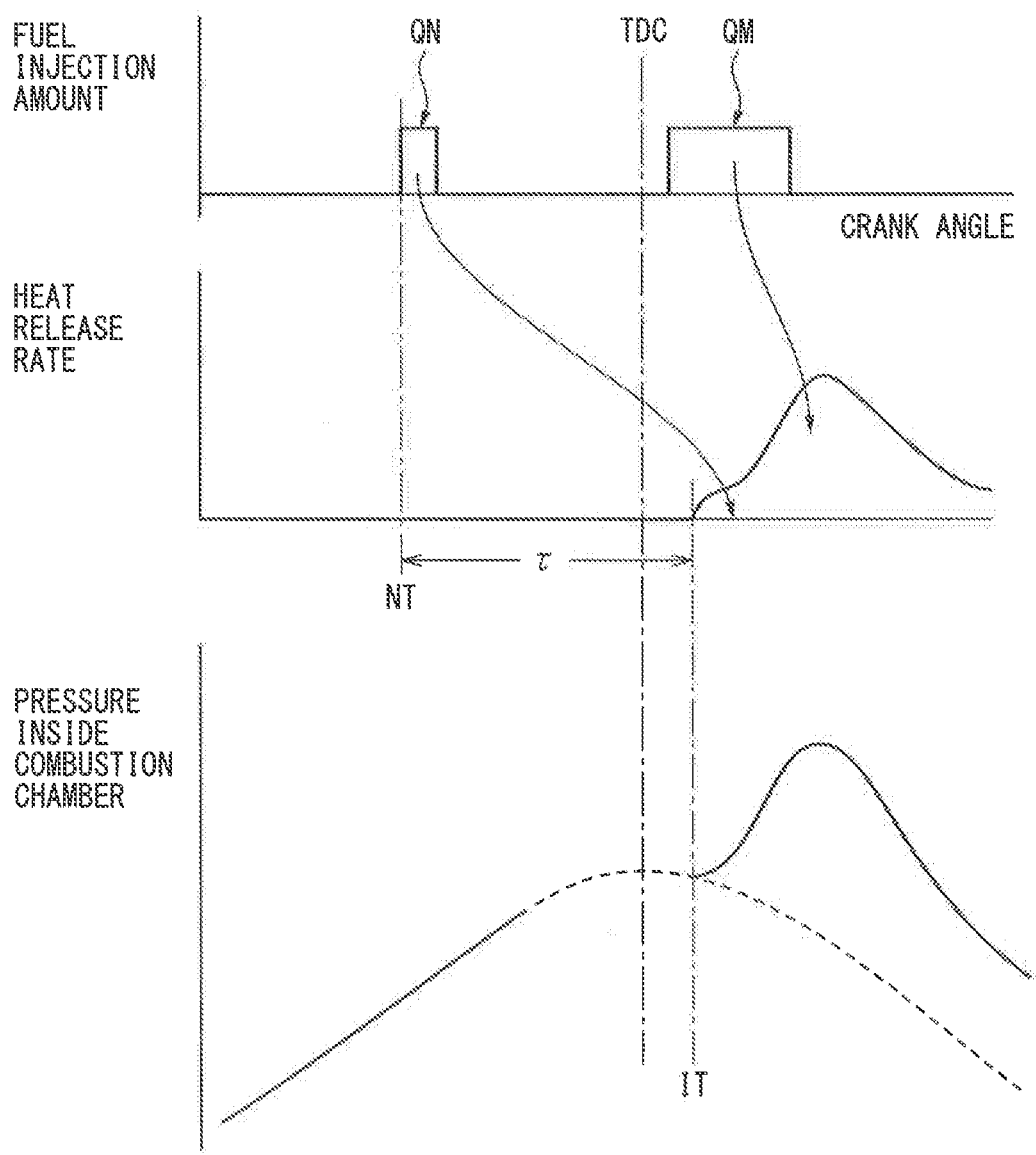
FIG. 16 is a view showing a fuel injection amount, heat release rate, and change in pressure in a combustion chamber.

Next, while referring to FIGS. 15 and 16, the injection control performed when the injection timing of the main injection fuel QM is slightly retarded as compared with the case shown in FIG. 4 to lower the combustion noise will be explained. Note that, similarly to FIG. 4, FIGS. 15 and 16 show a fuel injection amount from the fuel injector 3, heat release rate, and change in pressure in the combustion chamber 2. In addition, FIG. 15 shows an example in case where the engine speed is lower, and FIG. 16 shows an example in case where the engine speed is higher. In the case shown in FIG. 15, the main injection fuel QM is injected from the fuel injector 3 during the compression stroke before the compression top dead center TDC, and this action of injection of the main injection fuel QM from the fuel injector 3 is made to end after the compression top dead center TDC. On the other hand, in the case shown in FIG. 16, the action of injection of the main injection fuel QM from the fuel injector 3 is made to start after the compression top dead center TDC. Note that, in the embodiment shown in FIGS. 15 and 16, the action of injection of the main injection fuel QM from the fuel injector 3 is made to start within a range of crank angle from 10 degree before the compression top dead center to 10 degree after the compression top dead center, On the other hand, also in the embodiment shown in FIGS. 15 and 16, a smaller amount of auxiliary injection fuel QN than the main injection fuel QM is injected from the fuel injector 3 during the compression stroke before the main injection fuel QM. In this case, in either one of cases shown in FIGS. 15 and 16, the target compression ignition timing IT is set in advance based on experiments between the time of start of injection of the main injection fuel QN and the time of completion of injection of the main injection fuel QN, and similarly to the embodiment shown in FIG. 4, the injection timing NT of the auxiliary injection fuel QN is set so that the time period τ from when the auxiliary injection fuel QN is injected to when the crank angle reaches the target compression ignition timing IT becomes constant. In this case, the time period τ shown in FIGS. 15 and 16 is the same as the time period τ shown in FIG. 4. Namely, in either one of cases shown in FIGS. 15 and 16, the injection timing NT of the auxiliary injection fuel QN is controlled so that the rate of the premixed charge with the equivalent ratio Φ of 1.0 to 2.0 becomes the maximum at the target compression ignition timing IT. In this case, in the embodiment shown in shown in FIGS. 15 and 16, the injection timing NT of the auxiliary injection fuel QN is controlled to an injection timing whereby the premixed charge compression ignition of the main injection fuel QM is caused by the heat generated by the premixed charge compression ignition of the auxiliary injection fuel QN after the start of injection of the main injection fuel QM.

Also in the embodiment shown in FIGS. 15 and 16, as shown by the hatched plane in FIG. 7, the higher the engine speed N becomes, the more the injection timing NT of the auxiliary injection fuel QN is advanced. Note that, in the embodiment shown in FIGS. 15 and 16, the target compression ignition timing IT is slightly retarded as compared with the embodiment shown in FIG. 4, and accordingly, the injection timing NT of the auxiliary injection fuel QN becomes on the slightly retarded side of the injection timing NT shown by the hatched plane in FIG. 7. Note that, the injection timing NT of the auxiliary injection fuel QN used in the embodiment shown in FIGS. 15 and 16 is also stored in advance in the form of a three dimensional map shown in FIG. 7. In addition, also in the embodiment shown in FIGS. 15 and 16, an operational control of the engine is performed by using the operational control routine shown in FIG. 10. In this case, also in the case shown in FIGS. 15 and 16, the main injection fuel QM is injected around when the cool flame reaction of the auxiliary injection fuel QN occurs. Therefore, the injected auxiliary injection fuel QN is cooled by the latent heat of vaporization of the main injection fuel QM. As a result, the occurrence of the hot flame reaction is delayed.

On the other hand, the second embodiment shown in FIGS. 11A, 11B and 12 and the third embodiment shown in FIGS. 13 and 14 can be applied to the case shown in FIGS. 15 and 16. In this case, when the second embodiment shown in FIGS. 11A, 11B and 12 is applied to the case shown in FIGS. 15 and 16, the injection timing NT of the auxiliary injection fuel QN and the injection timing CT of the cooling-use fuel QC become on the slightly retarded side of the injection timing MT and the injection timing CT, which are shown by the hatched plane in FIG. 11B and, when the third embodiment shown in FIGS. 13 and 14 is applied to the case shown in FIGS. 15 and 16, the injection timing NT of the auxiliary injection fuel QN becomes on the slightly retarded side of the injection timing NT which is shown by the hatched plane in FIG. 13. Note that, the injection timing NT of the auxiliary injection fuel QN and the injection timing CT of the cooling-use fuel QC in case where the second embodiment or the third embodiment is applied to the case shown in FIGS. 15 and 16 are stored in advance in the form of a three dimensional map as shown in FIG. 11B or 13. In addition, even when the second embodiment or the third embodiment is applied to the case shown in FIGS. 15 and 16, an operational control of the engine is performed by using the operational control routine shown in FIG. 12 or the operational control routine shown in FIG. 14.

On the other hand, in the embodiment shown in FIG. 4, the injection of the main injection fuel QM from the fuel injector 3 is started at a crank angle before the compression top dead center and after 10 degree before the compression top dead center. Conversely, in the embodiment shown in FIGS. 15 and 16, the injection of the main injection fuel QM is started within a range of crank angle from 10 degree before the compression top dead center to 10 degree after the compression top dead center. In addition, in the embodiment shown in FIG. 4, the injection timing NT of the auxiliary injection fuel QN is controlled to an injection timing whereby the premixed charge compression ignition of the main injection fuel QM is caused by a heat generated by the premixed charge compression ignition of the auxiliary injection fuel QN after the completion of injection of the main injection fuel QM. Conversely, in the embodiment shown in FIGS. 15 and 16, the injection timing NT of the auxiliary injection fuel QN is controlled to an injection timing whereby the premixed charge compression ignition of the main injection fuel QM is caused by a heat generated by the premixed charge compression ignition of the auxiliary injection fuel QN after the start of injection of the main injection fuel QM.

Taking all the embodiments shown in FIGS. 1 to 16 into consideration, in the present invention, in a control system of a compression ignition type internal combustion engine comprising a fuel injector 3 arranged in a combustion chamber 2 and an electronic control unit 30 controlling a fuel injection action from the fuel injector 3, a main injection fuel injected from the fuel injector 3 is ignited by a premixed charge compression ignition, the electronic control unit 30 is configured to start an injection of the main injection fuel QM from the fuel injector 3 within a range of crank angle from 10 degree before the compression top dead center to 10 degree after the compression top dead center and make a smaller amount of auxiliary injection fuel QN than the main injection fuel QM be injected from the fuel injector 3 before the main injection fuel QM to ignite the auxiliary injection fuel QN by the premixed charge compression ignition, and the electronic control unit 30 is further configured to control an injection timing of the auxiliary injection fuel QN to an injection timing whereby the premixed charge compression ignition of the main injection fuel QM is caused by a heat generated by the premixed charge compression ignition of the auxiliary injection fuel QN after a start of injection of the main injection fuel QM.

The invention claimed is:

1. A control system of a compression ignition type internal combustion engine comprising a fuel injector arranged in a combustion chamber and an electronic control unit controlling a fuel injection action from the fuel injector, a main injection fuel injected from the fuel injector being ignited by a premixed charge compression ignition, wherein said electronic control unit is configured to start an injection of the main injection fuel from the fuel injector within a range of crank angle from 10 degree before the compression top dead center to 10 degree after the compression top dead center and make a smaller amount of auxiliary injection fuel than the main injection fuel be injected from the fuel injector before the main injection fuel to ignite the auxiliary injection fuel by the premixed charge compression ignition, said electronic control unit is further configured to control an injection timing of the auxiliary injection fuel to an injection timing whereby the premixed charge compression ignition of the main injection fuel is caused by a heat generated by the premixed charge compression ignition of the auxiliary injection fuel after a start of injection of the main injection fuel, wherein a target compression ignition timing of the auxiliary injection fuel for causing the premixed charge compression ignition of the main injection fuel at a predetermined timing is set in advance between a time of the completion of injection of the main injection fuel and the compression top dead center or between a time of the start of injection of the main injection fuel and a time of the completion of injection of the main injection fuel, and said electronic control unit is configured to determine the injection timing of the auxiliary injection fuel so that a time period from when the auxiliary injection fuel is injected to when a crank angle reaches said target compression ignition timing becomes constant.

2. The control system of a compression ignition type internal combustion engine as claimed in claim 1, wherein the injection timing of the auxiliary injection fuel is advanced proportionally to an increase of engine speed.

3. The control system of a compression ignition type internal combustion engine as claimed in claim 1, wherein the injection timing of the auxiliary injection fuel is advanced proportionally to an increase of the engine speed so that a rate of a premixed charge with an equivalent ratio of 1.0 to 2.0 in a premixed charge generated by the auxiliary injection fuel becomes maximum at said target compression ignition timing.

4. The control system of a compression ignition type internal combustion engine as claimed in claim 1, wherein an exhaust gas recirculation device for recirculating exhaust gas to an intake passage is provided, and said electronic control unit is configured to control a recirculated amount of exhaust gas to control the premixed charge compression ignition timing of the auxiliary injection fuel to said target compression ignition timing.

5. The control system of a compression ignition type internal combustion engine as claimed in claim 1, wherein cooling use fuel is injected at a predetermined crank angle after a completion of injection of the auxiliary injection fuel and before a start of injection of the main injection fuel when the engine speed is higher than a predetermined speed.

6. The control system of a compression ignition type internal combustion engine as claimed in claim 1, wherein a swirl control device for controlling a swirl flow generated in an engine combustion chamber is provided, and the injection timing of the auxiliary injection fuel is retarded the more the swirl flow is strengthened.

7. The control system of a compression ignition type internal combustion engine as claimed in claim 1, wherein said electronic control unit is configured to make the injection of the main injection fuel from the fuel injector be completed during a compression stroke before the compression top dead center and control the injection timing of the auxiliary injection fuel to an injection timing whereby the premixed charge compression ignition of the main injection fuel is caused by a heat generated by the premixed charge compression ignition of the auxiliary injection fuel after a completion of injection of the main injection fuel.

8. A control system of a compression ignition type internal combustion engine comprising a fuel injector arranged in a combustion chamber and an electronic control unit controlling a fuel injection action from the fuel injector, a main injection fuel injected from the fuel injector being ignited by a premixed charge compression ignition, wherein said electronic control unit is configured to start an injection of the main injection fuel from the fuel injector within a range of crank angle from 10 degree before the compression top dead center to 10 degree after the compression top dead center and make a smaller amount of auxiliary injection fuel than the main injection fuel be injected from the fuel injector before the main injection fuel to ignite the auxiliary injection fuel by the premixed charge compression ignition, said electronic control unit is further configured to control an injection timing of the auxiliary injection fuel to an injection timing whereby the premixed charge compression ignition of the main injection fuel is caused by a heat generated by the premixed charge compression ignition of the auxiliary injection fuel after a start of injection of the main injection fuel, wherein a target compression ignition timing of the auxiliary injection fuel for causing the premixed charge compression ignition of the main injection fuel at a predetermined timing is set in advance between a time of the completion of injection of the main injection fuel and the compression top dead center or between a time of the start of injection of the main injection fuel and a time of the completion of injection of the main injection fuel, and said electronic control unit is configured to control the injection timing of the auxiliary injection fuel to an injection timing at which the premixed charge compression ignition timing of the auxiliary injection fuel becomes said target compression ignition timing.

9. The control system of a compression ignition type internal combustion engine as claimed in claim 8, wherein the injection timing of the auxiliary injection fuel is advanced proportionally to an increase of engine speed.

10. The control system of a compression ignition type internal combustion engine as claimed in claim 8, wherein the injection timing of the auxiliary injection fuel is advanced proportionally to an increase of the engine speed so that a rate of a premixed charge with an equivalent ratio of 1.0 to 2.0 in a premixed charge generated by the auxiliary injection fuel becomes maximum at said target compression ignition timing.

11. The control system of a compression ignition type internal combustion engine as claimed in claim 8, wherein an exhaust gas recirculation device for recirculating exhaust gas to an intake passage is provided, and said electronic control unit is configured to control a recirculated amount of exhaust gas to control the premixed charge compression ignition timing of the auxiliary injection fuel to said target compression ignition timing.

12. The control system of a compression ignition type internal combustion engine as claimed in claim 8, wherein cooling use fuel is injected at a predetermined crank angle after a completion of injection of the auxiliary injection fuel and before a start of injection of the main injection fuel when the engine speed is higher than a predetermined speed.

13. The control system of a compression ignition type internal combustion engine as claimed in claim 8, wherein a swirl control device for controlling a swirl flow generated in an engine combustion chamber is provided, and the injection timing of the auxiliary injection fuel is retarded the more the swirl flow is strengthened.

14. The control system of a compression ignition type internal combustion engine as claimed in claim 8, wherein said electronic control unit is configured to make the injection of the main injection fuel from the fuel injector be completed during a compression stroke before the compression top dead center and control the injection timing of the auxiliary injection fuel to an injection timing whereby the premixed charge compression ignition of the main injection fuel is caused by a heat generated by the premixed charge compression ignition of the auxiliary injection fuel after a completion of injection of the main injection fuel.

* * * * *